United States Patent [19]
Clausen et al.

[11] 4,454,551
[45] Jun. 12, 1984

[54] CLEANING APPARATUS FOR A CASSETTE PLAYER

[75] Inventors: Eivind Clausen; James D. Allsop, both of Bellingham, Wash.

[73] Assignee: Allsop, Inc., Bellingham, Wash.

[21] Appl. No.: 337,945

[22] Filed: Jan. 7, 1982

[51] Int. Cl.³ .......................... G11B 5/10; G11B 5/41; A47K 7/02; A47K 1/06
[52] U.S. Cl. .................................. 360/137; 15/210 R; 360/128
[58] Field of Search .................. 360/93, 128, 132, 135, 360/137; 369/289; 15/210, 100, 32

[56] References Cited
U.S. PATENT DOCUMENTS

| | | | |
|---|---|---|---|
| 3,810,230 | 5/1974 | Orlowski | 360/128 |
| 3,955,214 | 5/1976 | Post | 15/210 R |
| 4,065,801 | 12/1977 | Leaming | 360/137 |
| 4,141,053 | 2/1979 | Kara | 360/137 |
| 4,225,893 | 9/1980 | Loiselle | 360/128 |
| 4,272,796 | 6/1981 | Van Kreuningen | 360/137 |

*Primary Examiner*—Robert M. Kilgore
*Attorney, Agent, or Firm*—Hughes, Barnard & Cassidy

[57] ABSTRACT

A cassette housing having a reciprocating wiper arm which comprises a front end cleaning section, a rear portion pivotally mounted to the housing, and an intermediate spring portion. The spring portion comprises three relatively rigid link sections joined to one another by two relatively flexible elbow sections, with the link sections extending generally laterally in a general "Z" configuration.

14 Claims, 10 Drawing Figures

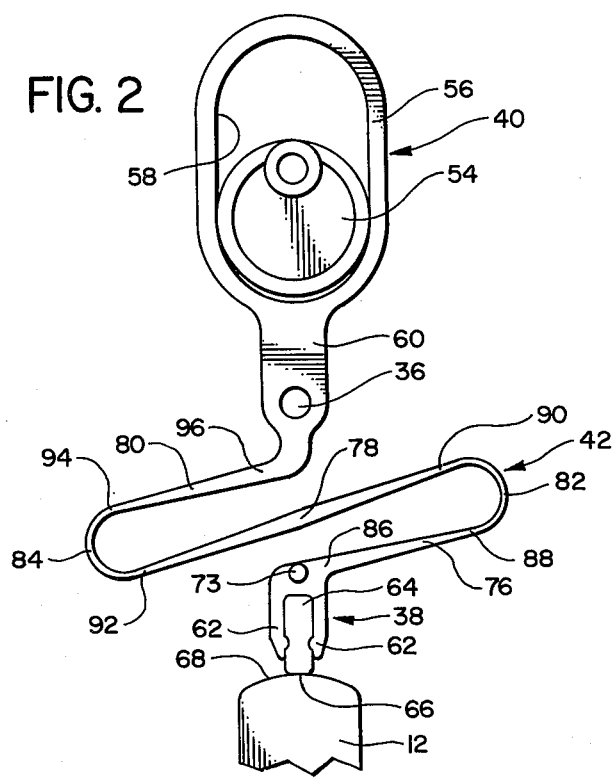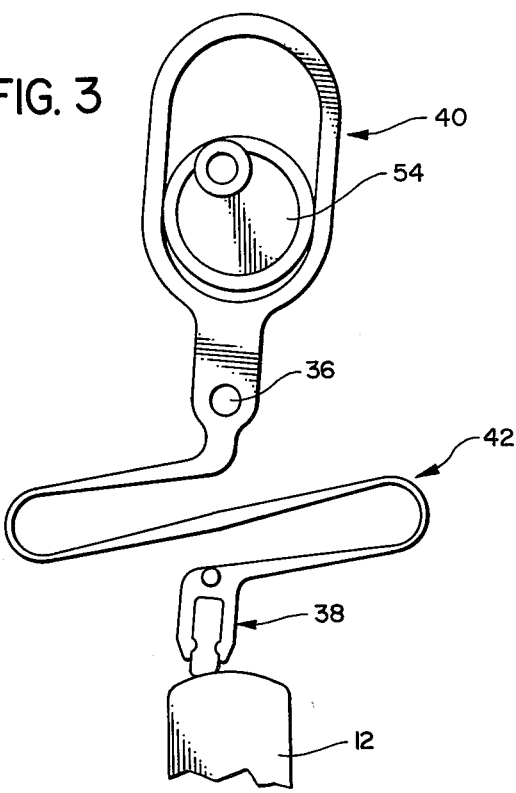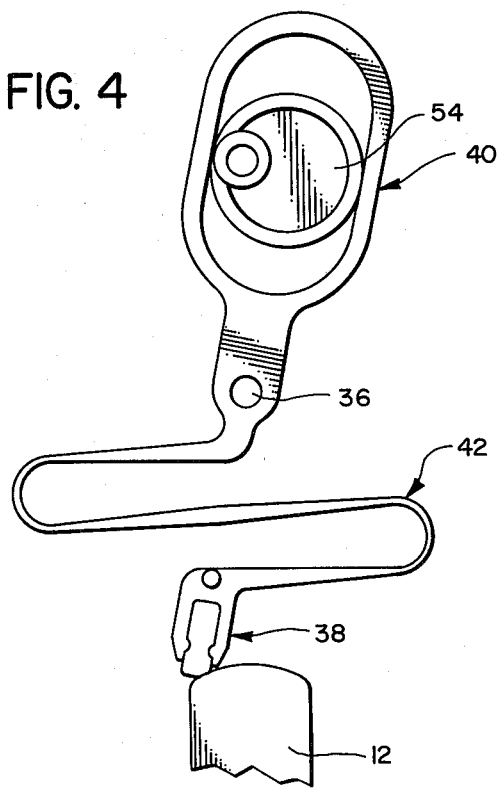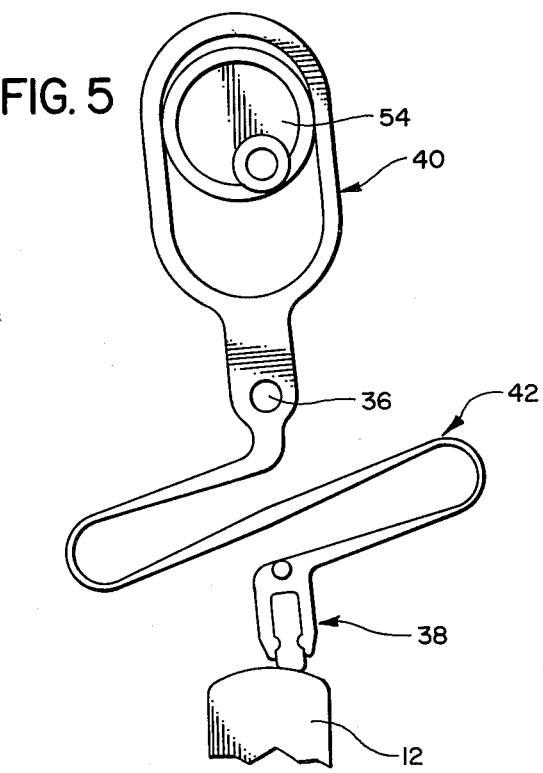

CLEANING APPARATUS FOR A CASSETTE PLAYER

BACKGROUND OF THE INVENTION

This invention relates to a cleaning device for a playing head of a player and/or recording unit.

To clean the playing/recording head of a playing-/recording unit, there are disclosed in the prior art devices which employ a cassette-like housing having a wiper arm pivotally mounted therein for reciprocating motion. At one end of the wiper arm, there is a cleaning pad which wipes back and forth against the head of the unit. In some instances, the wiper arm has a spring device which resiliently urges the cleaning pad against the head of the unit. One of the problems encountered is that the head configurations of some units differ from one another, and also the location of the head in its playing mode is sometimes at a more forward or at a more rearward position in different units.

Also, in at least some of these prior art units, the wiper arm is moved back and forth by a drive mechanism that is driven from a spindle of the unit. Another problem arises from the fact that if the wiper arm encounters too much resistance in moving across the head of the unit, this resistance will trigger an automatic shut-off mechanism in the unit which stops operation of the cleaning device.

In view of the foregoing, it is an object of the present invention to provide a cleaning device for a player and/or recording unit, which reliably cleans the head of the unit, without encountering undesirably high resistance to the cleaning motion of the device.

SUMMARY OF THE INVENTION

The apparatus of the present invention is adapted to clean a head member of a player and/or recording unit. This apparatus comprises a housing adapted to be placed in the unit in a cleaning position, with the housing having a forward end and a rear end.

There is an arm member mounted in the housing and comprising a first forward end portion adapted to have a cleaning member mounted thereto. The arm member has a longitudinal axis extending rearwardly from the first end portion. Further, the arm has a second mounting portion by which the arm member is mounted to the housing for oscillating motion to cause the first end portion to move back and forth on a path generally transverse to the longitudinal axis.

The arm member further comprises a third intermediate spring portion by which the first portion is connected to the second portion. The third portion comprises first and second relatively felxible elbow sections which are spaced laterally from one another relative to the longitudinal axis. The first elbow section is connected to the first forward end portion to permit the elbow section to bend relative to said first end portion. The second elbow portion is connected to the second mounting portion to permit the second elbow section to bend relative to the second mounting portion. There is a laterally extending relatively rigid first link section interconnecting the first and second elbow section. Thus, the first end portion of the arm is able to be deflected forwardly and rearwardly on its longitudinal axis relative to the second mounting portion and also to deflect laterally and rearwardly relative to the second mounting portion.

Desirably, the elbow sections are positioned on opposite sides of the longitudinal axis, with the two elbow sections being positioned substantially directly opposite one another relative to the longitudinal axis. Also, in the preferred form the elbow sections are substantially equally distant from the longitudinal axis.

In the preferred form, the arm member is pivotally mounted to the housing at a forward portion of the second mounting portion. Also, in the preferred form the apparatus comprises drive means adapted to be driven from the unit to cause the oscillating motion of the arm.

Further, in the preferred form, the first elbow section is connected to the first forward end portion by a second relatively rigid laterally extending second link section. Also, the second elbow section is connected to the second portion by a third laterally extending relatively rigid link section. Thus, the second and first link sections can flex angularly to one another about the first elbow section, and the first and third link sections can flex angularly to one another about said second elbow section. Further, in this specific configuration shown herein, the first link section slants moderately rearwardly toward the first elbow section relative to the longitudinal axis.

Also, the present invention comprises an arm member having the characteristics noted above, with the arm member being adapted to be mounted to the housing for reciprocating movement therein.

Other features of the present invention will become apparent from the following detailed description.

BRIEF DESCRIPTION OF THE DRAWINGS

FIG. 2 is a top plan view of only the wiper arm and actuating cam of the present invention, with the arm engaging a head of a player and/or recording unit;

FIGS. 3, 4, 5 and 6 are figures similar to FIG. 2, illustrating the wiper arm in various positions as it wipes across the head of the unit;

DESCRIPTION OF THE PREFERRED EMBODIMENT

Figure 1:
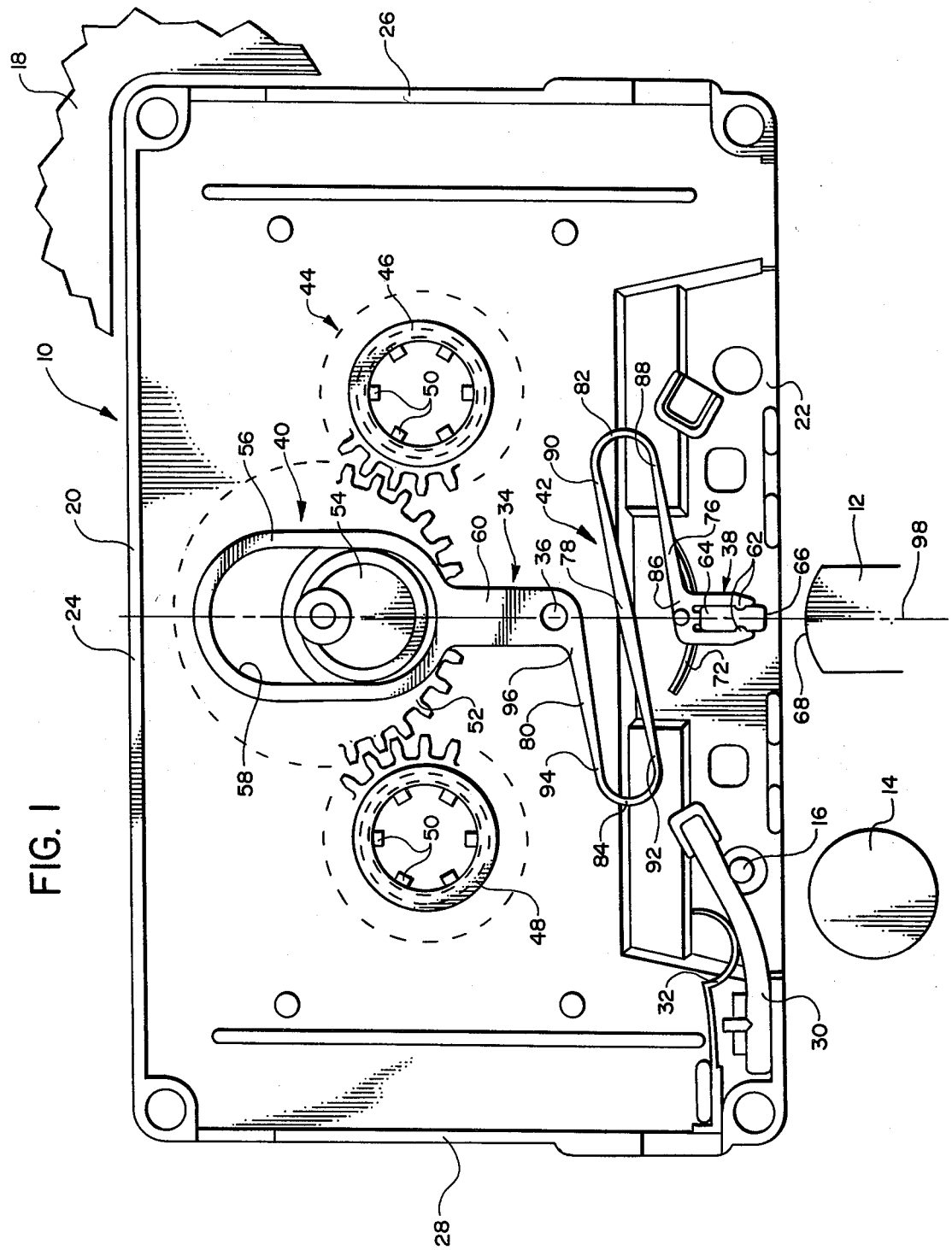
FIG. 1 is a top elevational view of the present invention, with the top cover removed for purposes of illustration.
Figure 6:
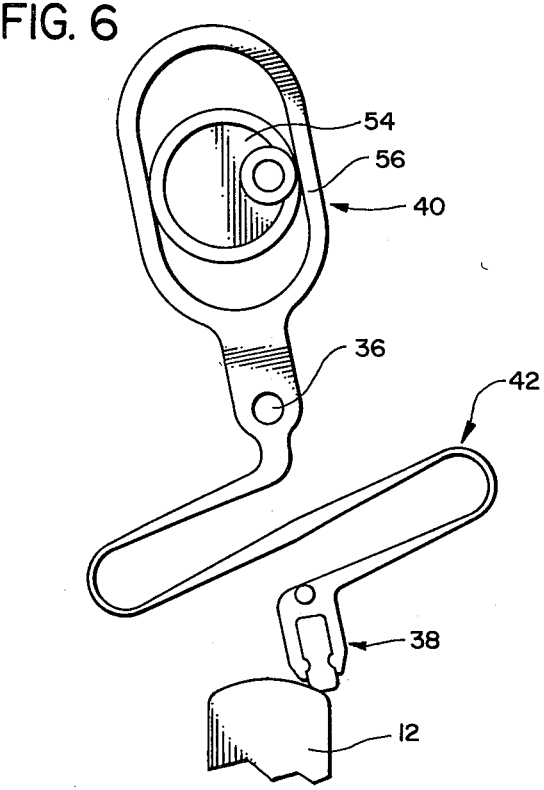

With reference to FIG. 1, there is shown a cassette cleaner 10 of the present invention. Also shown are the head 12, pinch roller 14 and capstan 16 of a conventional player and/or recording unit, only a portion of which is shown at 18 for ease of illustration. The cassette cleaner 10 is positioned in a recess of the unit 18, which recess normally receives a tape cassette to be used in the unit.

The cassette cleaner 10 comprises a cassette-like housing 20 having the same general configuration as a conventional cassette housing of a tape cassette. For purpose of illustration, the top cover of the housing 20 is not shown in FIG. 1. This housing 20 has a forward end 22, a rear end 24 and right and left sides 26 and 28, respectively.

At the forward left hand side of the housing 20, there is a cleaning pad 30 to engage and clean the capstan 16 and pinch roller 14, with this pad 30 being urged into its cleaning position by a spring member 32. This pad 30 and spring 32 already exist in the prior art and do not comprise part of the present invention.

At the central portion of the housing 20, there is a wiper arm 34, pivotally mounted by a pin at 36 to the housing 20. This arm 34 comprises a forward cleaning end portion 38, a rear portion 40, and an intermediate spring portion 42.

To cause the arm 34 to oscillate about its pivot location 36, there is provided a drive mechanism, generally designated 44. This mechanism 44 comprises right and left gears 46 and 48, respectively, each having a hollow center and interior teeth 50 to engage a related right or left drive spindle of the unit 18. The exterior teeth of the gears 46 and 48 mesh with a larger center gear 52 formed with an integral circular eccentrically mounted cam member 54. In the operation of the present invention, depending upon the particular construction of the unit 18, either the right or left gear 46 or 48 is driven by its related spindle, and the other gear 46 or 48 is also driven through the action of the center gear 52. This insures that the two drive spindles engaging the two gears 46 and 48 rotate at the same speed to prevent operation of a shut-off mechanism which exists in some units 18. (In some player/recorder units, if the unit senses that the two sprockets are not rotating synchronously, this resulting in most instances when the tape of a tape cassette has broken, the unit automatically shuts off.)

The rear end portion 40 of the arm 34 comprises a cam follower 56 which is formed as a closed loop defining an elongate slot 58 having a width just slightly larger than the cam 54. The rear end portion 40 extends forwardly at 60 from the cam follower 56 to the pivot location 36.

The forward end 38 of the arm 34 is formed as a pair of forwardly extending fingers 62 that receive a cleaning pad 64. The pad 64 protrudes a moderate distance beyond the fingers 62 to present a forward cleaning surface 66 that engages the operating surface 68 of the head 12. This head operating surface 68 engages the playing tape in normal operation, and thus it is this surface 68 which is subject to contamination and which must be cleaned periodically.

The lower wall 70 of the housing 20 is formed with a small upstanding arcuate ridge 72 to engage a downwardly extending pin that is located at the rear portion of the front cleaning end 40 of the arm 34. There is also an upper pin 73 engaging a similarly positioned upper ridge. This prevents the forward arm portion 40 from protruding too far from the housing 20.

Of particular significance in the present invention is the arrangement of the intermediate spring portion 42 of the arm 34. This spring portion 43 comprises first, second and third relatively rigid link sections 76, 78 and 80, respectively, and first and second relatively flexible elbow sections 82 and 84. These spring sections 76-84 are made as a single integral portion of the arm 34 and can be characterized generally as having a flattened "Z" configuration.

The first link section 76 is fixedly connected at one end 86 to the forward arm portion 38 and by its other end 88 to a forward end of the first elbow section 82. The second link section 78 has one end 90 connected to the rear end of the first elbow section 82, and a second end 92 connected to a forward end of the second elbow section 84. The third link section 80 is connected by one end 94 to the rear end of the second elbow section 84 and by a second end 96 to the forward rear arm portion 60 at a location close to the pivot location 36.

The two elbow sections 82 and 84 each curve in approximately a 180° arc. The three link sections 76, 78 and 80 each have a substantially straight line configuration, are generally parallel to one another and extend substantially transversally to the longitudinal axis 98 of the arm 34. (This longitudinal axis 98 is considered as extending from the front end arm portion 38 thru the pivot location 36.) The vertical width of the spring portion 42 and the front end portion 38 is substantially constant. However, the horizontal thickness dimension of each of the three link sections 76, 78 and 80 is substantially greater than that of the two elbow sections 82 and 84, with the link sections 76, 78 and 80 tapering moderately in thickness as each approaches the elbow sections 82 and 84. Thus, there is relatively little bending of the link sections 76, 78 and 80, while substantially all of the bending or flexing of the spring portion 42 takes place at the two elbow sections 82 and 84. Thus the two link sections 76 and 80 extend in substantially opposite directions from the arm axis 98, and the link section 78 extends across the arm axis 98.

While the three link sections 76, 78 and 80 extend generally transversally to the longitudinally axis 98 of the arm 34, they have a moderate rearward slant toward the right, so that with the arm 34 centered, the two elbow sections 82 and 84 are more nearly directly opposite one another relative to the longitudinal arm axis 98, and approximately equally distant from the axis 98.

To describe the operation of the present invention, the cassette cleaner 10 is placed in the recess of the unit 18, so that the pad 64 mounted in the forward arm portion 38 is positioned near and opposite to the operating surface 68 of the head 12. An operating lever or knob of the unit 18 is moved to place the unit in its playing mode. This causes the head 12 of the unit 18 to move rearwardly through a forward opening 100 in the front wall of the cassette housing 20 to engage the pad 64. At the same time, either or both of the right spindles (engaging the right gear 46) and the left spindle (engaging the left gear 48) begin to turn so that all three gears 46, 48 and 52 begins to rotate. This in turn causes the cam 54 to rotate and move the cam follower 56 of the arm 34 in a reciprocating motion to cause the pad 64 to wipe back and forth across the surface 68 of the head 12.

FIGS. 2 thru 6 illustrate the action of the arm 34 as the pad 64 moves across the surface 68. The head can have different configurations and in many instances will be shaped in a convex curve so that the outer portions of the surface 68 slope forwardly to a moderate extent away from the pad 64. In some instances, the surface 68 will have a compound curve where there are two convexly curved surfaces adjacent one another, with a middle recess. In yet other instances, the surface 68 can have two flat slanting surfaces. With the spring portion 42 having the two flexing elbow sections 82 and 84 spaced a relatively large distance from one another in opposite sides of the axis 98, forward and rear spring movement of the arm end portion 38 distributes the corresponding spring movement along the length of the first link section 76 and the second link section 78. Thus, the pad 64 is readily able to move further forwardly or rearwardly to reliably follow the contour of the head surface 66, and the force with which the spring portion 42 urges the pad 64 against the surface 66 changes only slightly.

Figure 7:
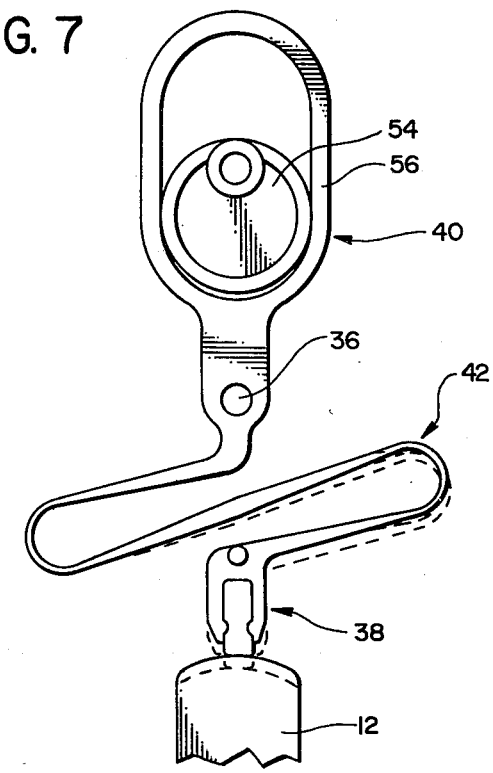
FIG. 7 is a view similar to FIG. 2, showing the wiper arm engaging a head which extends further toward the wiper arm, and showing in broken lines the wiper arm in the position of FIG. 2, where the head is positioned further forwardly.

To illustrate another facet of the present invention, reference is made to FIG. 7, where the head 12 is shown where it has moved to its operating position at a location (shown in full lines) further rearward from the position shown in FIG. 2 (shown in broken lines in FIG. 7.) It can be seen that the end portion 38 is moved moderately rearwardly, but the direction of movement is substantially parallel to the longitudinal axis 98 of the arm 34. (As indicated previously herein, some units 18 differ in that the operating position of the head 12 is at a more forward or more rearward position.) With the present arrangement of the spring portion 42, the forward arm end 38 and its associated pad 64 remain properly centered relative to the head surface 66 so that the entire surface 66 can be cleaned, regardless of the forward or rearward location of the head 12.

Figure 8:
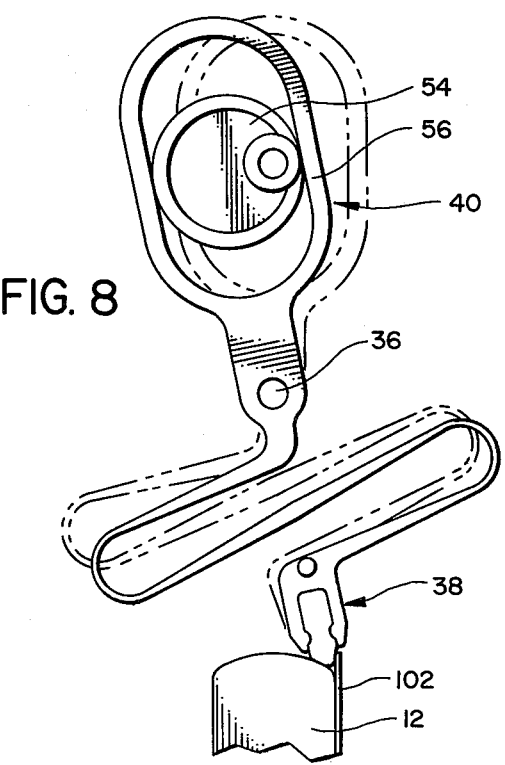
FIG. 8 is a view similar to FIG. 2, showing the wiper arm in full lines engaging a tape guide adjacent the player head, and in broken lines moving to a position where the wiper arm moves free of the tape guide.
Figure 9:
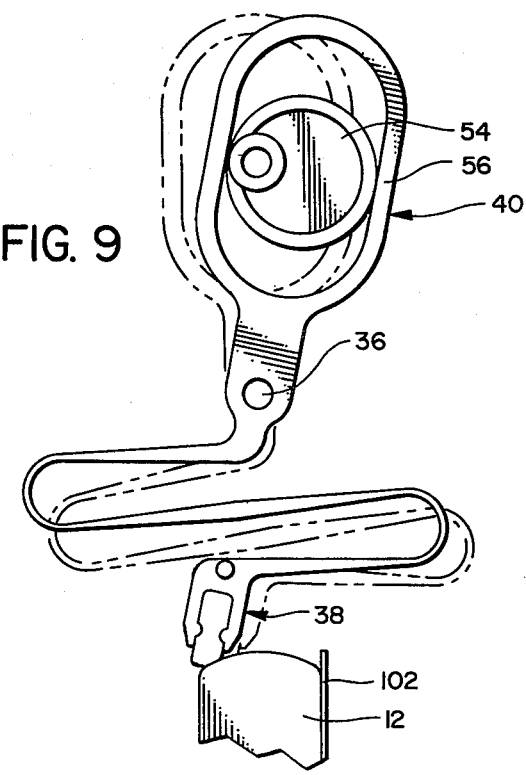
FIG. 9 is a view similar to FIG. 8, showing a similar situation as in FIG. 8, but with the wiper arm on the opposite side of the cleaning head.
Figure 10:
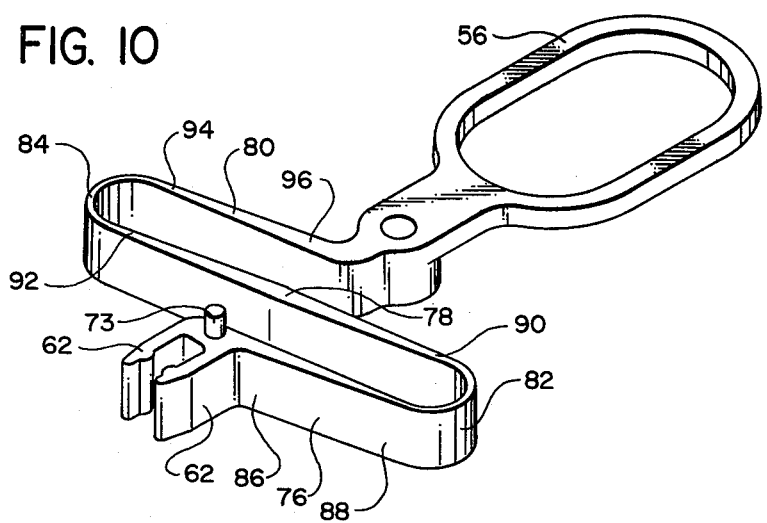
FIG. 10 is an isomteric view of the wiper arm.

Yet another facet of the present invention is illustrated in FIGS. 8 and 9. It sometimes occurs, due to variations of the player/recorder units 18, that the cleaning pad 64 at its extreme end of travel encounters an obstruction to its return movement. As illustrated in FIG. 8, this could occur possibly by the presence of a tape guide indicated at 102 in FIG. 8. In the circumstance where this does occur, as the arm 34 moves so as to urge the pad 64 toward the left, the spring portion 42 flexes about the two elbow sections 82 and 84 (as illustrated in FIG. 8, with the amount of deflection shown in the broken lines of FIG. 8 being somewhat exaggerated for purposes of illustration.) The effect is that the pad 64 is pulled to the left and free of the obstructing guide 102 without substantial resistance so as to continue its wiping motion across the head surface 66.

With reference to FIG. 9, let it be assumed that somewhat the same situation occurs as shown in FIG. 8, but on the opposite side of the surface 68. The obstruction may result, for example, by the pad 64 slipping possibly a short distance over the side edge of the surface 68. In this instance also the flexing of the spring portion 42 permits the pad 64 to move free of the obstruction (this also being shown in broken lines), with any excessive resisting force applied against the pad 64.

It is to be understood that certain modifications of the present invention can be made without departing from the basic teachings of the invention.

What is claimed is:

1. A cleaning apparatus adapted to clean a head member of a player and/or recording unit, said apparatus comprising:
   a. a housing adapted to be placed in said unit in a cleaning position, said housing having a forward end and a rearward end,
   b. an arm member mounted in said housing and comprising a first forward end portion adapted to have a cleaning member mounted thereto, a longitudinal axis extending rearwardly from said first end portion, and a second mounting portion by which said arm is mounted to said housing for oscillating motion to cause said first end portion to move back and forth on a path generally transverse to said longitudinal axis,
   c. said arm further comprising a third intermediate spring portion by which said first portion is connected to said second portion, said third portion comprising first and second relatively flexible elbow sections which are spaced laterally from one another relative to said longitudinal axis, said first elbow section being connected to the first forward end portion to permit said first elbow section to bend relative to said first end portion, said second elbow portion being connected to the rear mounting portion to permit said second elbow section to bend relative to said second mounting portion, a laterally extending relatively rigid first link section interconnecting the first and second elbow sections, whereby the first end portion of the arm is able to be deflected forwardly and rearwardly on its longitudinal axis relative to the rear mounting portion and also to deflect laterally and rearwardly relative to the rear mounting portion.

2. The apparatus as recited in claim 1, wherein said elbow sections are positioned on opposite sides of said longitudinal axis.

3. The apparatus as recited in claim 2, wherein said two elbow sections are positioned substantially directly opposite one another relative to said longitudinal axis.

4. The apparatus as recited in claim 3, wherein said elbow sections are substantially equally distant from said longitudinal axis.

5. The apparatus as recited in claim 1, wherein said arm member is pivotally mounted at a forward portion of said second mounting portion, said apparatus further comprising drive means adapted to be driven from said unit to cause the oscillating motion of the arm.

6. A cleaning apparatus adapted to clean a head member of a player and/or recording unit, said apparatus comprising:
   a. a housing adapted to be placed in said unit in a cleaning position, said housing having a forward end and a rearward end,
   b. an arm member mounted in said housing and comprising a first forward end portion adapted to have a cleaning member mounted thereto, a longitudinal axis extending rearwardly from said first end portion, and a second mounting portion by which said arm is mounted to said housing for oscillating motion to cause said first end portion to move back and forth on a path generally transverse to said longitudinal axis,
   c. said arm member further comprising a third intermediate spring portion by which said first portion is connected to said second portion, said third spring portion comprising first and second relatively flexible elbow sections which are positioned on opposite sides of said longitudinal axis and spaced laterally from one another, said first and second elbow sections being connected to one another by a relatively rigid first link section extending laterally across said longitudinal axis, said first elbow section being connected to the first forward end portion by a second relatively rigid laterally extending second link section, said second elbow section being connected to said second portion by a third laterally extending relatively rigid link section, in a manner that said second and first link sections can flex angularly to one another about said first elbow section, and said first and third link sections can flex angularly to one another about said second elbow section.

7. The apparatus as recited in claim 6, wherein said first and second elbow sections are positioned substantially directly opposite one another relative to the longitudinal axis, and the first link section slants moderately rearwardly toward said first elbow section relative to said longitudinal axis.

8. The apparatus as recited in claim 6, wherein said arm is pivotally mounted at a forward portion of said second mounting portion, said apparatus further comprising drive means adapted to be driven from said unit to cause the oscillating motion of the arm.

9. A wiper arm adapted to be mounted in a cleaning apparatus for oscillating motion to wipe against a component of an audio and/or recording unit, said arm member comprising:
   a. a first forward end portion adapted to have a cleaning member mounted thereto, said arm member having a longitudinal axis extending through said first forward end portion,
   b. a second rear mounting portion by which said arm member is adapted to be mounted to said apparatus for said oscillating motion,
   c. a third intermediate spring portion by which said first portion is connected to said second portion, said third portion comprising first and second relatively flexible elbow sections which are spaced laterally from one another relative to said longitudinal axis, said first elbow section being connected to the first forward end portion to permit said first elbow section to bend relative to said first end portion, said second elbow portion being connected to the rear mounting portion to permit said second elbow section to bend relative to said second mounting portion, a laterally extending relatively rigid first link section interconnecting the first and second elbow sections,
whereby the first end portion of the arm is able to be deflected foreardly and rearwardly on its longitudinal axis relative to the rear mounting portion and also to deflect laterally and rearwardly relative to the rear mounting portion.

10. The apparatus as recited in claim 9, wherein said elbow sections are positioned on opposite sides of said longitudinal axis.

11. The apparatus as recited in claim 10, wherein said two elbow sections are positioned substantially directly opposite one another relative to said longitudinal axis.

12. The apparatus as recited in claim 11, wherein said elbow sections are substantially equally distant from said longitudinal axis.

13. A wiper arm adapted to be mounted in a cleaning apparatus for oscillating motion to wipe against a component of an audio and/or recording unit, said arm member comprising:
   a. a first forward end portion adapted to have a cleaning member mounted thereto, said arm member having a longitudinal axis extending through said first forward end portion,
   b. a second rear mounting portion by which said arm is adapted to be mounted to said apparatus for said oscillating motion,
   c. a third intermediate spring portion by which said first portion is connected to said second portion, said third spring portion comprising first and second relatively flexible elbow sections which are positioned on opposite sides of said longitudinal axis and spaced laterally from one another, said first and second elbow sections being connected to one another by a relatively rigid first link section extending laterally across said longitudinal axis, said first elbow section being connected to the first forward end portion by a second relatively rigid laterally extending second link section, said second elbow section being connected to said second portion by a third laterally extending relatively rigid link section, in a manner that said second and first link sections can flex angularly to one another about said first elbow section, and said first and third link sections can flex angularly to one another about said second elbow section.

14. The apparatus as recited in claim 13, wherein said first and second elbow sections are positioned substantially directly opposite one another relative to the longitudinal axis, and the first link section slants moderately rearwardly toward said first elbow section relative to said longitudinal axis.

* * * * *

UNITED STATES PATENT AND TRADEMARK OFFICE
CERTIFICATE OF CORRECTION

PATENT NO. : 4,454,551
DATED : June 12, 1984
INVENTOR(S) : Clausen et al It is certified that error appears in the above—identified patent and that said Letters Patent is hereby corrected as shown below:

Column 1, line 54, "felxible" should read --flexible--.

Column 7, line 43, "foreardly" should read --forwardly--.

Signed and Sealed this

Twenty-second Day of February, 1994

Attest:

BRUCE LEHMAN

*Attesting Officer*     Commissioner of Patents and Trademarks